United States Patent [19]

Beerwald et al.

[11] Patent Number: 4,942,337
[45] Date of Patent: Jul. 17, 1990

[54] SPARK GAP APPARATUS TRIGGERABLE BY MICROWAVE PULSE

[76] Inventors: Hans Beerwald, Kalkgasse 2, 5370 Kall-Sistig, Fed. Rep. of Germany; Günter Bohm, Potthofstr. 30, 5840 Witten, Fed. Rep. of Germany

[21] Appl. No.: 209,110

[22] Filed: Jun. 20, 1988

[30] Foreign Application Priority Data

Jun. 25, 1987 [DE] Fed. Rep. of Germany ....... 3721007
Dec. 23, 1987 [DE] Fed. Rep. of Germany ....... 3743756

[51] Int. Cl.$^5$ ............................................. H01J 25/34
[52] U.S. Cl. ..................................... 315/39; 315/325; 315/39.3; 333/13; 333/99 R
[58] Field of Search ................. 315/39, 325, 244, 242, 315/326, 39.3; 331/127; 333/13, 99; 307/106, 107

[56] References Cited

U.S. PATENT DOCUMENTS

| | | | |
|---|---|---|---|
| 3,281,719 | 10/1966 | Goldberg | 315/39 |
| 3,351,806 | 11/1967 | Farber et al. | 315/39 |
| 3,360,678 | 12/1967 | Kerns | 315/3 |
| 3,424,943 | 1/1969 | Quine et al. | 315/39 |
| 3,484,619 | 12/1969 | Proud, Jr. | 307/106 |
| 3,521,121 | 7/1970 | Proud, Jr. | 315/58 |
| 3,681,656 | 8/1972 | Mitchell | 315/223 |
| 4,003,007 | 1/1977 | Stewart | 333/20 |
| 4,028,583 | 6/1977 | Bigham | 315/39.69 |
| 4,104,558 | 8/1978 | Proud, Jr. et al. | 315/39 |
| 4,477,746 | 10/1984 | Piltch | 315/39 |
| 4,727,298 | 2/1988 | Mendel | 315/39 |

OTHER PUBLICATIONS

"Measurements Of A 70 T Pulsed Magnetic System With Long Operational Life", N. Thomas Olson, J. Bandas and A. C. Kolb, *J. Appl. Physics,* 50 (1979) 7768.
"Rail-Gap Switches Triggered by Semiconductor Edge Discharges", N. Siddon and P. H. Dickinson, *Rev. Sc. Instr.,* 58 (1987) 804.

*Primary Examiner*—Eugene R. LaRoche
*Assistant Examiner*—Ali Neyzari
*Attorney, Agent, or Firm*—Fitch, Even, Tabin & Flannery

[57] ABSTRACT

A spark gap apparatus triggerable by application of a microwave pulse. The apparatus includes a first electrode including a microwave waveguide, and a second electrode spaced from the first electrode. A microwave generator is connected to supply microwave pulses to the waveguide. A main current circuit to be switched is connected to the electrodes. The first and second electrodes include components for causing the simultaneous existence of a number of spark channels therebetween in response to coupling of a microwave pulse to the waveguide so that coupling of the pulse to the waveguide results in switching of the main current circuit. A method of using the spark gap apparatus is also disclosed.

10 Claims, 2 Drawing Sheets

SPARK GAP APPARATUS TRIGGERABLE BY MICROWAVE PULSE

This invention concerns electrical switching apparatus and, more particularly, spark gap apparatus which can be triggered to close a circuit to provide a high current pulse in response to application of a microwave pulse.

BACKGROUND OF THE INVENTION

Spark gaps are needed to produce high current pulses that are used, for example, for excitation of certain gas lasers (excimer lasers), to produce shock waves, for high speed machining of metal materials or for electromagnetic acceleration of missles and projectiles.

According to the state of the art, mostly three-electrode spark gaps are used as triggerable spark gaps where the third electrode is used for ignition at a precisely defined time (see R. Winkler, "High Speed Machining—Principles and Technological Use of Electrically Produced Shock Waves and Pulsed Magnetic Fields," VEB Verlag Technik Berlin, 1973, pages 52–76). In the buildup phase, spark gaps have an inductance on the order of about 30 nH/cm. This has a negative or limiting effect on the steepness of the current rise. Therefore, there have been attempts to simultaneously produce a number of parallel spark channels. For example, it is known in the state of the art that three-electrode spark gaps with several spark channels can be constructed (see N. Thomas Olson, J. Bandas, A. C. Kolb, J. Appl. Physics, 50 (1979), 7768, N. Seddon, P. H. Dickinson, Rev. Sc. Instr., 58 (1987), 804).

One disadvantage of such three-electrode spark gaps is that they are limited to a relatively narrow operating voltage range which must be slightly below the breakdown voltage and can be adjusted by varying the electrode spacing and/or the gas pressure.

This disadvantage is avoided with the two-electrode spark gaps known according to the state of the art whereby a high voltage pulse with steep flanks is applied to the electrodes for the purpose of ignition. With such two-electrode spark gaps the operating voltage range extends down to extremely low voltages. The high voltage pulse needed for ignition, however, necessitates introduction of a decoupling inductance into the supply line to the energy source and/or to the load but this has an interfering effect in generating high current pulses with steep flanks. In order to ameliorate the interfering influence of the decoupling inductance, there have been attempts to use a ferrite material that can be saturated for the decoupling inductance. Essentially only a single spark channel is produced between the electrode pair with this type of spark gap.

It is also known according to the state of the art that a two-electrode spark gap can be ignited by the action of ionizing radiation on the space between the electrodes. Suitable ionizing radiation here would be a radioactive corpuscular or electromagnetic radiation in the form of X-rays or laser beams (see R. Winkler, supra). In addition, according to this literature reference, ignition of a spark gap can also be accomplished by triggering photoelectrons or thermal electrons by applying a sufficiently strong UV pulse or laser pulse to the cathode so these photoelectrons or thermal electrons can then serve to ignite the spark gap. These processes are tedious and dangerous to use and they necessitate an extremely high structural expense so they have not been successful in practice. Furthermore, the operating voltage with this spark gap must be close to the breakdown voltage.

A triggerable spark gap has been proposed wherein the electrodes are mounted on opposite walls of a microwave waveguide to which a microwave generator (magnetron) is attached, generating high power microwave pulses. The voltage applied to the electrodes—as with most of the spark gaps discussed above—is slightly below the breakdown voltage. When the microwave pulse is coupled into the waveguide, the microwave field distorts the electric field between the electrodes in such a way that sparking between the electrodes occurs, but here again only one spark channel is usually formed. This spark gap has the disadvantage that it functions satisfactorily only in the immediate vicinity of the breakdown voltage. This breakdown voltage may change rapidly, however, e.g., due to burnup of the electrodes, due to different geometric relationships or due to the pressure of the gas between the electrodes. For further information regarding the structure and operation of such a triggerable spark gap, reference may be made to U.S. Pat. No. 4,477,746, the teachings of which are incorporated by reference herein. Because of the close proximity of the operating voltage to the breakdown voltage and the frequent positive or negative variations that occur in the breakdown voltage, there is the danger of outage and/or misfiring with these previously known spark gaps.

SUMMARY OF THE INVENTION

Among the aspects and features of the present invention may be noted the provision of improved triggerable spark gap apparatus in which the operating voltage can be any desired level below the breakdown voltage so as to permit largely trouble-free operation while at the same time a large number of spark channels can be produced in a controlled manner. The electrodes of the spark gap apparatus have a configuration which provides several spark channels caused by microwave energy alone when the microwave pulse is coupled regardless of the dc voltage applied to the electrodes.

The spark gap according to this invention has the special advantage that it functions satisfactorily largely independent of the operating voltage so in burnup or erosion of the electrodes or in other changes in operating conditions outage and/or misfiring are reduced or eliminated. Another advantage of the spark gap apparatus according to this invention is that the designer is largely free in the the geometric design of the waveguide system so, if necessary, large area electrodes can be produced with a very large number of spark channels or spark paths to be fired simultaneously. This has the special advantage that the unavoidable burnup or erosion of the electrodes is distributed more uniformly on the electrodes so the electrodes retain their shape and spacing for a longer period of time.

A first version of a spark gap apparatus according to this invention provides for a waveguide having one or more interruptions or perforations in wall areas where the microwave pulse generates high wall currents so sparks are formed in these interruptions in the wall when the microwave pulse is coupled and the walls of a composite waveguide system are formed in part by one electrode and in part by the other electrode.

With such a configuration of the waveguide system, the sparks initiating the spark-over between electrodes are produced completely independently of the operating voltage applied to the electrodes with the exclusive use of the energy of the coupled microwave pulse. The interruptions in the walls of the waveguide system are located precisely where they should not be for the purposes of optimum microwave propagation. These interruptions in the wall are thus so-called "forbidden slits" that are normally not allowed in microwave conductors. The invention utilizes these so-called "forbidden slits" to generate spark channels in which the sparks of the main circuit then spark over. Since the sparks initiating the spark-over between electrodes are produced regardless of the operating voltage applied to the electrodes, it is therefore possible to work with operating voltages that are far below the breakdown voltage so it is not so easy for the above-mentioned outage and/or misfiring to occur. Furthermore, with this spark gap it is possible in the simplest manner to ignite substantially simultaneously a very large number of spark channels so extremely high currents can be switched in the shortest possible period of time without resulting in locally concentrated burnup phenomena at the electrodes.

In this first version, the waveguide system preferably has a rectangular waveguide which forms the first electrode and is provided with openings on one broad side that are covered by a plate-like second electrode positioned parallel to the outside of the rectangular waveguide and a small distance away from it in which case brackets are provided on the rectangular waveguide at the side next to the openings and these are also arranged so they are parallel and a small distance away from the second electrode and project outwardly from the side edges of the openings by half a wavelength or by an integral multiple of half a wavelength. In this design of the electrodes, the sparks are preferably formed at the edges and partially also in the flat area of the brackets.

Another practical example of a spark gap according to this invention provides for the waveguide system to have a hollow conductor waveguide that has a conductor inside it insulated from the waveguide so the waveguide and the conductor together form the two electrodes of the spark gap. This version of the invention thus no longer works with the so-called "forbidden slits" but instead with a conductor in a waveguide so the conductor represents the counterelectrode and also causes a local field in excess of the incident microwave field which leads to the development of several spark channels between the waveguide and the conductor regardless of the dc voltage applied to the electrodes.

In this version, the conductor on the side facing away from the microwave generator preferably has a projection that is a smaller distance away from the waveguide than the remaining longitudinal areas of the conductor. This projection of the conductor causes a further increase in the microwave field strength in this area and in this way produces the first striking of a spark which is immediately followed by other spark-overs between the conductor and the wall of the waveguide. These sparks which follow immediately take place exclusively in the length area of the conductor which extends from the projection in the direction of the microwave generator.

In addition to the practical examples discussed in detail above, a number of other configurations of the waveguide system are also conceivable wherein the initial sparks are generated exclusively by input of the microwave energy without the assistance of the voltage applied to the electrodes.

DESCRIPTION OF THE PREFERRED EMBODIMENTS

Figure 1:
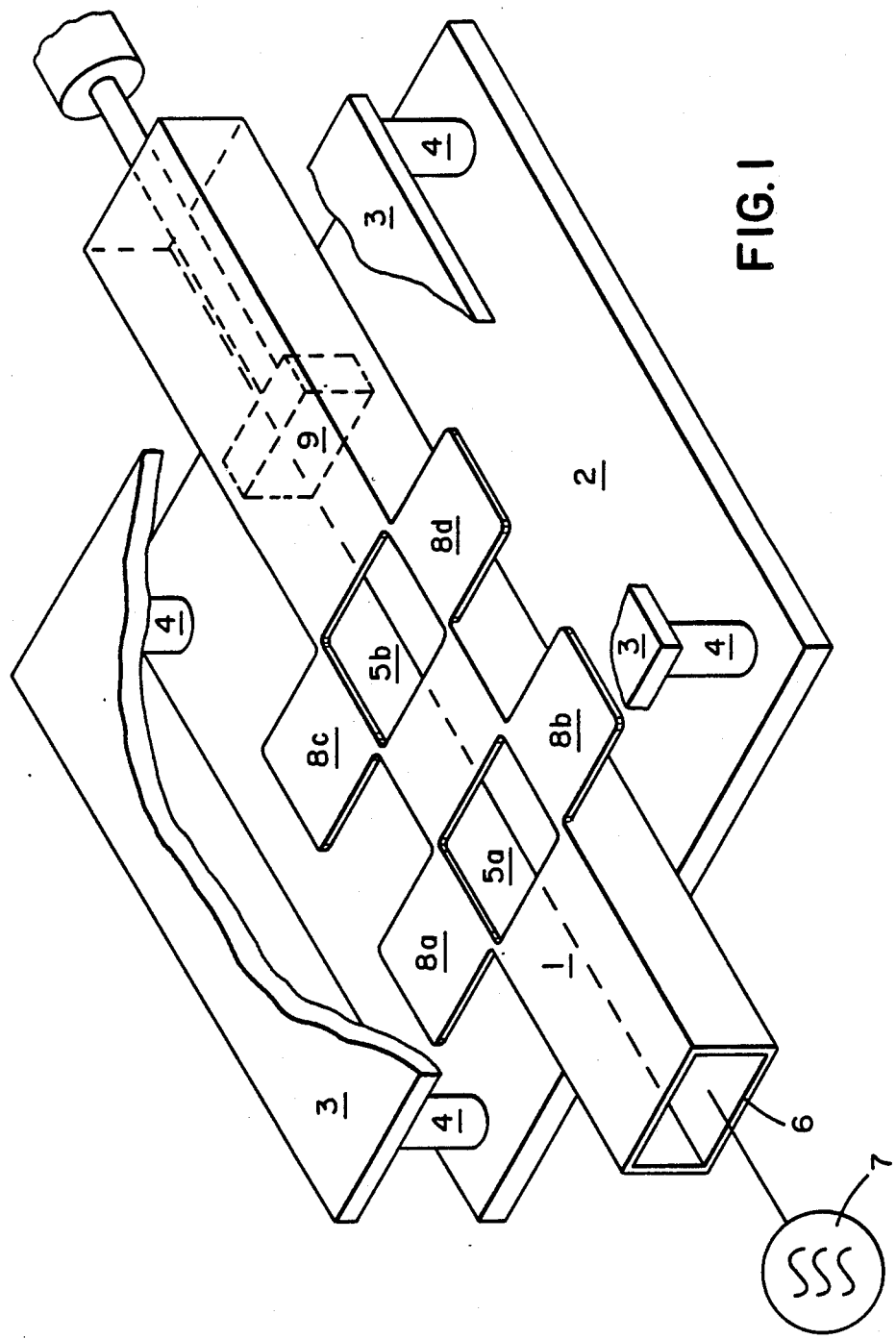
FIG. 1 is a perspective diagram of spark gap apparatus embodying various aspects of the present invention, with certain components broken away to expose other components.

The waveguide shown in FIG. 1 (type WR 112, $31.75 \times 15.88 \times 1.65$ mm) is labeled as 1 and together with a base plate 2 forms one electrode of a spark gap. The opposite electrode 3 of the spark gap is a simple metal plate mounted on base plate 2 with four insulating supports 4. The electrode spacing (distance between the upper broad side of waveguide 1 and metal plate 3) is 2 mm. The electrodes 1 and 3 comprise means for causing the simultaneous existence of a plurality of spark channels therebetween. Waveguide 1 has two rectangular openings $5a$, $5b$ in the upper broad side covered by opposite electrode 3 at a distance of about 2 mm so emission of the microwave pulse (9 GHz, 200 kW pulse power, pulse duration 0.2 microseconds) fed into waveguide 1 through opening 6 by means of a microwave generator 7 is largely suppressed. High frequency currents are also generated in counterelectrode 3. High u.h.f. voltages are generated here between the edges of holes $5a$, $5b$ and counterelectrode 3 leading to sparks. Thus the edges of the holes and overlying portions of the electrode 3 form, in effect, a composite waveguide system. To increase u.h.f. field strength between the edges of opening $5a$, $5b$ and upper electrode 3, there are brackets $8a$, $8b$, $8c$ and $8d$ mounted at the sides and projecting outward by half wavelength from the side edges of openings $5a$, $5b$. For the same reason the distance between the two openings $5a$ and $5b$ is likewise half a wavelength (16.5 mm). A reflector 9 that can be inserted into the waveguide is adjusted so as to form the largest possible number of spark channels simultaneously.

Surge current circuits with charging voltages up to 5 kV have been switched successfully with this spark gap, and up to 14 parallel spark channels or paths have been observed.

If switching is to be done at a higher operating voltage, the distance between waveguide 1 and counterelectrode 3 must be enlarged accordingly. However, since this distance should be as small as possible in comparison with the dimensions of openings $5a$, $5b$ in the wall of waveguide 1, a waveguide 1 with a larger cross section would be preferable at a lower microwave frequency.

Figure 2:
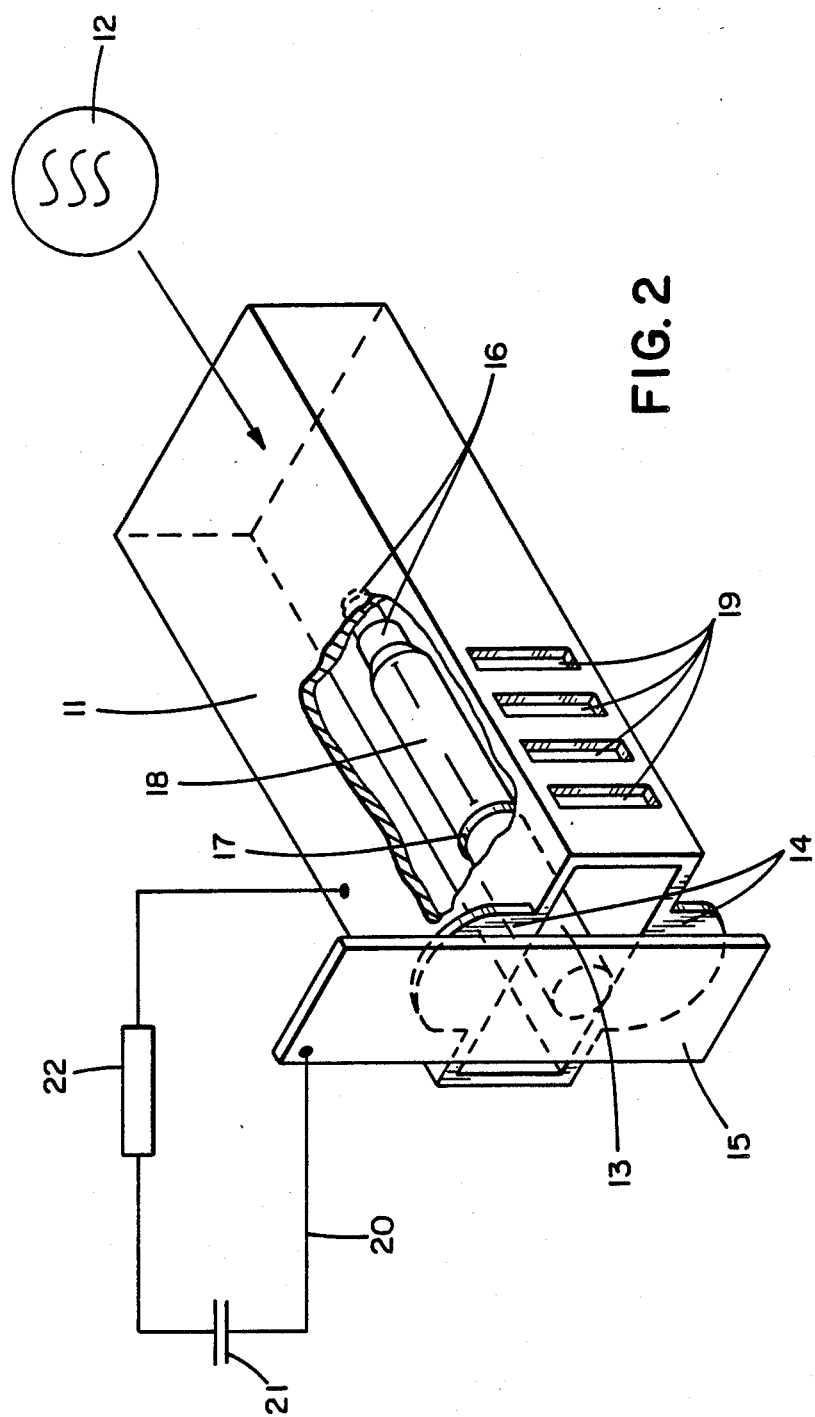
FIG. 2 is a perspective diagram of an alternative embodiment of the spark gap apparatus of the present invention, also with certain components broken away to expose other components.

An alternative embodiment of a spark gap apparatus according to this invention is shown in FIG. 2. It includes a rectangular waveguide 11 whose interior dimensions are $28.5 \times 12.6$ mm. A microwave generator 12 that generates high power microwave pulses is connected to this rectangular waveguide 11 in a suitable manner on one side. An internal conductor 13 that is mounted so it is insulated with respect to rectangular waveguide 11 in a manner not shown in detail here is provided inside the rectangular waveguide 11 on the end facing away from microwave generator 12. Rectangular waveguide 11 on the one hand and the internal conductor 13 on the other hand at the same time form the two electrodes of the spark gap.

Rectangular waveguide 11 has two brackets 14 that project outward at right angles on its broad side on the end facing away from microwave generator 12 with an average bracket length of about 8 mm, i.e., ¼ the wavelength. Internal conductor 13 is connected at the end projecting out of waveguide 11 to a metal plate 15 which is positioned a small distance away from brackets 14 and together with them assures a high reflection factor at the end of waveguide 11 so leakage of microwave energy at this end of the waveguide is adequately suppressed.

The inner conductor 13 projecting into waveguide 11 is designed so it tapers in steps at its end that points in the direction of microwave generator 12 so as to produce a junction in microwave power that is as free of reflection as possible at this point. The steps are labeled with the number 16. Furthermore, the inner conductor is provided with a ring-shaped projection 17 that is somewhat thicker and has an outside diameter of 8 mm in the area of the end section of the inner conductor facing away from microwave generator 12. This ring-shaped projection 17 of inner conductor 13 leads at this point to a further increase in microwave field strength and causes the first spark-over which is followed immediately by other sparks between the inner conductor 13 and the broad wall of waveguide 11. The sparks which follow immediately occur on the section 18 of inner conductor 13 pointing toward microwave generator 12.

The narrow side walls of waveguide 11 are provided with ventilation slits 19 running across the longitudinal direction in the longitudinal area of inner conductor 13. These ventilation slits 19 run parallel to the wall currents and are thus "allowed slits." The ventilation slits 19 serve to allow the passage of a stream of air or gas to clean the spark gap of vapors and burnoff dust.

The main current circuit 20 to be switch consists of a capacitor battery 21 and an inductor 22 and is connected to the rectangular waveguide 11 on the one hand and metal plate 15 of the inner conductor 13 on the other hand.

With a model SFD-354 pulse magnetron (pulse power about 200 kW, frequency 9 GHz, pulse duration 2 sec) as the microwave generator, 10 to 20 spark channels can be produced simultaneously with this spark gap with charging voltages of capacitor battery 21 (C=250 $\mu$F) of 100 V to 7 kV. The maximum pulse current is about 100 kA. The inductance 22 of the coil which is added in addition as a load in the discharge circuit is 1 H.

As a method of providing a high current pulse to a load 22 using triggerable spark gap apparatus, the invention comprises the following steps:

(a) The electrodes are connected in a circuit with a power source 21 and the load so that triggering of the electrodes causes a high current pulse from the power source to be applied to the load, and (b) A microwave pulse is applied to the waveguide. This pulse is of sufficient energy to cause a number of spark channels to simultaneously exist between the electrodes without regard to the voltage level of the power source.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A spark gap apparatus which is triggerable by application of a microwave pulse, said apparatus comprising:
    a first electrode comprising a microwave waveguide;
    a second electrode spaced from first electrode;
    a microwave generator connected to supply microwave pulses to said microwave waveguide;
    a main current circuit to be switched connected to said electrodes, said first and second electrodes comprising means for causing the simultaneous existence of a plurality of spark channels therebetween in response to coupling of a microwave pulse to said waveguide whereby coupling of a microwave pulse to said waveguide results in switching of said main current circuit.

2. Spark gap apparatus as set forth in claim 1 wherein said waveguide includes a wall where coupling of said microwave pulse generates high wall currents and said second electrode has portions adjacent said wall, said wall having at least one opening, said wall and said portions of said electrode forming a composite waveguide system whereby said spark channels are formed at said wall opening when said microwave pulse is coupled into said waveguide.

3. Spark gap apparatus as set forth in claim 1 wherein said microwave waveguide is a rectangular waveguide having a broad side with spaced openings, said second electrode being plate-shaped, said broad side and said second electrode being substantially parallel, said means for causing the simultaneous existence of a plurality of spark channels comprising said broad side and said second electrode.

4. Spark gap apparatus as set forth in claim 3 wherein said broad side and said second electrode are spaced by about 2 mm.

5. Spark gap apparatus as set forth in claim 3 wherein said first electrode further comprises brackets extending outwardly from said broad side flanking each of said openings, said brackets and said second electrode being substantially parallel.

6. Spark gap apparatus as set forth in claim 5 wherein said brackets project outwardly a distance of substantially an integral multiplier of half a wavelength of the microwave frequency.

7. Spark gap apparatus as set forth in claim 3 wherein said openings are spaced by a distance of substantially an integral multiplier of half a wavelength of the microwave frequency.

8. Spark gap apparatus as set forth in claim 1 wherein said second electrode is disposed extending longitudinally inside said waveguide and insulated therefrom, said second electrode having one end adjacent said microwave generator and an other end disposed remote from said microwave generator.

9. Spark gap apparatus as set forth in claim 8 wherein said second electrode has a projection adjacent said other end which projection is a smaller distance away from the waveguide than remaining longitudinal area of the second electrode.

10. A method of providing a high current pulse to a load using triggerable spark gap apparatus including a first electrode comprising a microwave waveguide and a second electrode spaced from said waveguide with said first and second electrodes comprising means for causing the simultaneous existence of a plurality of spark channels therebetween in response to coupling of a microwave pulse to said waveguide, said method comprising the following steps:

(a) connecting said electrodes in a circuit with a power source and a load so that triggering of said electrodes causes a high current pulse from said power source to be applied to said load; and (b) applying to said waveguide a microwave pulse of sufficient energy to cause said plurality of spark channels without regard to the voltage level of said power source.

* * * * *